United States Patent Office

2,970,054
Patented Jan. 31, 1961

2,970,054

SELF-GELATINIZING STARCH BEARING GRAINS AND METHOD OF PRODUCING SAME

Anthony J. Nugey, 428 Central Ave., and Anthony L. Nugey, 1271 Pierpont St., both of Rahway, N.J.

No Drawing. Filed June 15, 1953, Ser. No. 361,878

8 Claims. (Cl. 99—51)

This invention relates to improvements in brewing material for making beverages such as lager beer, ale, porter, stouts, Weissbeer and the like fermented beverages.

The principal materials used in the manufacture of fermented beverages are, barley malt, sugars, syrups, prepared starch-bearing grains which need no pre-cooking on brewery premises, and unprepared starch-bearing grains that require pre-cooking on such premises.

It is now usual to add the sugars and syrups directly into the brewkettle, and the prepared starch-bearing grains are loaded with barley malt into the mashtub or lautertub where the malt enzymes act on the soluble starches and invert them during the mashing period, as the temperatures progresses from 95° F. to not over 167° F. The unprepared starch-bearing grains must be pre-cooked in conjunction with ground barley malt in separate vessels known as rice tubs, converters and/or cereal cookers, to make the starches soluble. This pre-cooking operation is carried out in either atmospheric cookers where the final temperature is approximately 212° F., or in pressure cookers where the final temperature may reach 280° F. and over. Pressure cooking has little material effect, and entails innumerable disadvantages.

The use of unprepared starch-bearing grains to replace a part of the barley malt has been found to produce finished, fermented beverages, paler in color, less filling, longer shelf-life, more snap and character, and at substantially lower cost.

The principal raw or unprepared starch-bearing grains used are corn grits, corn meal, rice, rice flour and meal, refined (cornstarch) grits and the like. These unprepared starch-bearing grains must be treated on the brewery premises by pre-cooking them in the aforesaid vessels together with a portion of barley malt. The quantity of barley malt used with these unprepared starch-bearing grains ranges from 20% to 35% of total materials charged into the cooking vessels. In some cases a ratio of 1.0 lb. of barley malt to 1.3 lbs. of the unprepared starch-bearing grains is employed. In other instances only 10% of barley malt is used. But so little barley malt produces extremely low extract yields and in many cases variable quantities of unconverted starches adversely affect yeasts, impairs filtration and cause an early breakdown of the finished, fermented beverage.

The purpose of mixing barley malt with the unprepared starch-bearing grains is to maintain the starch-slurry in its liquid form and permit the completion of the boiling operation at the aforesaid elevated temperatures so that all starch shall be wholly and completely gelatinized. Improperly gelatinized starch will result in considerable extract loss, because the barley malt enzymes introduced into the mashtub, or lautertub will not act on ungelatinized starch.

If barley malt was left out of the cooking vessels, and the unprepared starch-bearing grains were heated therein with adequate water, the starch granules would thicken into a very viscous paste, making it impossible to continue further heating, or to continue the running of the agitator mechanism, and such starch would become a total loss. Also much labor would be needed to remove this viscous paste from the cooking vessel.

The starch commences to thicken into a viscous paste at about 154° F.; the higher the temperature the more viscous the starch-paste becomes. Barley malt contains the enzymes, peptases and diatases which keep insoluble portion of starch granules in liquid form, thereby preventing the thickening thereof; and insoluble proteins present in the grains are rendered soluble, too. In carrying out pre-cooking operations great care must be exercised so as not to inactivate, or destroy the barley malt enzymes described above. These enzymes are speedily inactivated as the temperature approaches 175° F.

Barley malts contain from 8% to 12% of husks and up to 13% proteins. The husks consist of cellulose, ash (silica and phosphates), pentosans, fats, tannin, resins and pigment colorings. Analysis also show that barley malt contains some 2% to 3% of viscous, fatty liquid which does possess bitter and unpleasant taste.

When barley malt is added into the cooking vessels containing the unprepared starch-bearing grains, the high temperatures prevailing therein tend to dissolve and decompose the aforesaid deleterious compounds, thereby impairing aroma, taste, flavor and color of the worts and in the finished, fermented beverages produced therefrom. Prolonging the cooking cycles manifestly concentrates these undesirable properties. Regardless what quantity of barley malt is used in these cooking vessels it must be adequately peptonized to render the barley malt proteins soluble, otherwise the finished fermented beverage will become turbid; their shelf-life will be shortened and considerable cloudy precipitates will settle in the bottom of the bottles and cans.

To carry out the peptonization cycle properly, the cooker mash comprised of barley malt and unprepared starch-bearing grains, in the presence of adequate water, requires not less than 60 minutes, and preferably up to 85 minutes at a constant optimum temperature of 110° F. In order to carry out this peptonization cycle considerable steam and electric energy must be consumed to heat the mash and to run the mixing agitator. The total time to gelatinize unprepared starch-bearing grains with barley malt ranges from 80 to 130 minutes.

The peptic and diastatic properties of commercial barley malts vary over a wide range; similarly, when barley is improperly malted (modified) and/or incorrectly kiln-dried, its enzymic properties will be too variable to carry on the gelatinization processes properly.

The use of unprepared starch-bearing grains to replace a portion of the barley malt comprising a typical brew, ranges from 25–50% of the unprepared starch-bearing grains to 75–50% of barley malt. A good quality of malt should yield 62–63% solids per 100 lbs. of such barley malt; corn grits yields about 75% solids per 100 lbs.; rice yields approximately 78% solids per 100 lbs. and refined grits (pure cornstarch) yields 90% per 100 lbs.

By replacing a portion of the barley malt it is very obvious that there is some economic benefit derived with the use of unprepared starch-bearing grains. But unfortunately, the economic benefits are neutralized due to the contaminants that barley malt husks generate in the finished, fermented beverages.

The object of this invention is to provide a process and product by which it will be possible to utilize the aforesaid unprepared starch-bearing grains, without any barley malt, to secure a more substantial and thorough gelatinization, that will result in economy of manufacturing costs, together with quality improvement of the finished, fermented beverages.

Another object is to simplify the operational duties of the brewery personnel, to obtain more perfect reactions in carrying out the gelatinization cycle, without the present costly technical control.

A further object is to gelatinize the unprepared starch-bearing grains without contaminating the worts and finished, fermented beverages.

And an additional object is to inoculate the unprepared starch-bearing grains with heat-stable, odorless and soluble, high potency enzymes.

A still further object is to make such unprepared starch-bearing grains "self-gelatinizing" through aforesaid inoculation.

Well suited for our purposes are heat-stable, odorless and soluble enzymes from cultured strains resulting from the growth of bacteria belonging to *B. subtilis* and *B. mesentericus* groups, which are the sources of extremely heat resistant, high potency amylolytic (starch liquefying) and proteolytic (protein splitting) enzymes.

Also suited for our purpose are high potency and heat-stable, odorless and soluble enzymes obtained from thermophylic bacteria capable of starch liquefaction and proteolysis.

Further suited for our purpose are the high potent and heat-stable, odorless and soluble fungal enzymes capable of amylolytic and proteolytic activities.

By heat-stable, or heat resistant, we mean all fungal and bacterial amylases and proteases having high potency amylolytic and proteolytic activities capable of withstanding temperatures up to 205° F. with a working range between 100° F. and 200° F.

Bacterial and fungal enzymic reactions are accelerated as the temperature is raised, without any loss of potency, and when these reactions are carried out in the presence of calcium-ions, phosphates and sodium salts, this greatly increases the liquefying action of these enzymes and serves besides as stabilizing mediums, thereby preventing deterioration to aforesaid enzymes.

In the preferred method of practicing our invention, the unprepared starch-bearing grains are inoculated with these heat-stable, odorless and soluble high potency enzymes at their sources, prior to shipment to brewery establishments. We have found that these enzymes are stable and will remain viable for long periods under normal storage conditions under which unprepared starch-bearing grains are stored.

The pre-inoculated unprepared starch-bearing grains are delivered to the brewery plants in any suitable containers, such as sacks, barrels, drums, or in bulk. A predetermined brew is decided upon, and the proper quantity of the pre-inoculated unprepared starch-bearing grains are put into the cooker, sometimes called the rice tub or converter, together with proper quantity of mashing water having a temperature between 100° F. to 110° F. and pH from 6.00 to 6.5. If this mashing water is too alkaline, adjustments are made with any suitable acid, preferably an organic acid like lactic acid; if the mashing water is too acid this is neutralized with either sodium carbonate or hydroxide.

Hereunder are two examples of carrying out the invention in atmospheric cookers which is given by way of illustration:

*Example 1*

Preinoculated refined grits (cornstarch) ____lbs__ 100
Mashing water adjusted to 6.00–6.50 pH ____lbs__ 300
Mashing in temperature _____° F__ 110
Come up time in 10 minutes to _____° F__ 160
Raised temperature in 5 minutes to _____° F__ 212
Boiled for 10 to 15 minutes at _____° F__ 212

Iodine reaction on completed wort is reddish-brown which indicates full and complete gelatinization, and a further physical test by rubbing a drop of the mash between fingers confirms complete gelatinization. Total gelatinizing time 30 minutes.

*Example 2*

Preinoculated corn grits, or preinoculated rice products _____lbs__ 100
Mashing water adjusted to 6.00–6.50 pH ____lbs__ 300
Mashing in temperature _____° F__ 110
Come up time in 10 minutes to _____° F__ 110
Raised temperature in 5 minutes to _____° F__ 212
Boiled for 30 minutes at _____° F__ 212

Iodine reaction on completed wort is yellow-brown which indicates full and complete gelatinization, and a further physical test by rubbing a drop of the mash between fingers confirms complete gelatinization. Total gelatinizing time 45 minutes.

Perfect gelatinization can be obtained with the aforesaid unprepared but preinoculated starch-bearing grains, without any barley malt, and consequently no peptonization is required, gelatinization is speedier, and the peptonization step which is essential when barley malt is used cojointly with unprepared starch-bearing grains can be dropped. The resultant mashes are more aromatic, with clean odor, neutral taste, finer flavor (free from strawy character) and gelatinized mashes so produced are very thin and free flowing, easily handled and there is an appreciable reduction in total heat energy and electric power to run the agitator, due to omission of the conventional peptonization cycle.

As brewery establishments are continuously searching for ways and means to stop waste and to increase efficiency, the use of self-gelatinizing (preinoculated) brewers' rice, rice flour, corn grits, refined grits (pure cornstarch) and similar unprepared starch-bearing grains are ideally suited for manufacturing fermented beverages.

The gain in extract, over normal brewery yields on unprepared, non-inoculated, starch-bearing grains are given hereunder:

|  | Percent gain in extract |
|---|---|
| Brewers' rice | 3–4 |
| Rice flour | 4–5 |
| Corn grits (coarse granulation) | 1½–2½ |
| Refined grits (pure cornstarch) | 4½–6 |

In this invention it is important to remove excess moisture from the unprepared starch-bearing grains, prior to inoculation. The normal range of moisture is given hereunder:

| Unprepared Starch-Bearing Grains | Moisture Content, Percent |
|---|---|
| Brewers' rice | 10.00–12.00 |
| Rice flour | 11.00–12.50 |
| Corn grits | 9.00–13.50 |
| Corn meal | 11.50–12.50 |
| Wheat flakes | 10.50–11.50 |
| Refined grits (cornstarch) | 11.00–12.50 |

To inoculate these aforesaid unprepared starch-bearing grains to make them self-gelatinizing, we first reduce the moisture normally present in them as shown above to not over 5.00%. This is done by any suitable atmospheric and/or thermal dehydration means. We then add a quantity of 10 to 100 grams of heat stable, odorless and soluble high potency enzymes to each 100 lbs. of aforesaid unprepared starch-bearing grains, and mingle intimately and thoroughly to disperse the grains and uniformly coat the external surfaces. This is accomplished by power driven mechanical mixing or mulling apparatus. The specific quantity of enzymes added is predetermined prior to inoculation; the enzymic potency must be carefully ascertained with respect to standard Northup units, and the specificity of starch with respect to amylose-amylopectin ratio, and granule size of the starch must be determined.

To disperse these enzyme quantities more readily and efficiently upon the starch granules, and to stabilize and activate said enzymes, we also add to the above proportions of enzymes, salts of calcium, phosphate and sodium in the proportion of 25 to 100 parts, to 1 to 5 parts of said enzymes premixed prior to the process of inoculation. But we have successfully, with diligence and care, inoculated the aforesaid unprepared starch-bearing grains without preparing pre-mixtures of said enzymes with said salts and subsequent gelatinization was wholly complete and satisfactory.

These salts of calcium, phosphate and sodium are present in mashing waters as natural elements and compounds, or have been artificially added to such mash waters by the well-known Burton salts comprised of calcium sulfate, sodium chloride and phosphate buffers to increase the water hardness which is required in the manufacture of fermented beverages.

Having described our invention, what we believe to be new is:

1. Starch-bearing grains free of malt contaminants, for brewing fermented beverages, inoculated with heat-stable, odorless, soluble high-potency enzymes, and forming a substantially dry final product.

2. Starch-bearing grains free of malt contaminants, for brewing fermented beverages, inoculated with heat-stable, odorless, soluble high-potency enzymes, said grains being one of a group consisting of corn grits, corn meal, ricke, rice flour, rice meal, and refined cornstarch grits, and forming a substantially dry final product.

3. Starch-bearing grains free of malt contaminants, for brewing fermented beverages, inoculated with heat-stable, odorless, soluble high-potency enzymes, said enzymes being amylolytic and proteolytic, and forming a substantially dry final product.

4. Starch-bearing grains free of malt contaminants, for brewing fermented beverages, inoculated with heat-stable, odorless, soluble high-potency enzymes, and derived from cultured starins of the growth of bacteria belonging to either the B. Subtilis or B. Mesentericus groups, and forming a substantially dry final product.

5. The method of producing a brew mash for making fermented beverages that is aromatic, neutral in taste and free from strawy flavor, with wort uncontaminated by substances derived from barley malt, said method consisting in first drying and then inoculating refined grits of cornstarch with heat-stable, odorless, soluble, high-potency enzymes, and then proceeding with the following steps in the proportions, time intervals and temperatures specified:

Preinoculated refined grits (cornstarch) _____lbs__ 100
Mashing water adjusted to 6.00–6.50 pH _____lbs__ 300
Mashing in temperature _____° F__ 110
Come up time in 10 minutes to _____° F__ 160
Raised temperature in 5 minutes to _____° F__ 212
Boiled for 10 to 15 minutes at _____° F__ 212

6. The method of producing a brew mash for making fermented beverages that is aromatic, neutral in taste and free from strawy flavor, with wort uncontaminated by substances derived from barley malt, said method consisting in first drying and then inoculating grits of corn or rice products with heat-stable, odorless, soluble, high-potency enzymes, and then proceeding with the following steps in the proportions, time intervals and temperatures specified:

Preinoculated corn grits, or preinoculated rice
  products _____lbs__ 100
Mashing water adjusted to 6.00–6.50 pH _____lbs__ 300
Mashing in temperature _____° F__ 110
Come up time in 10 minutes to _____° F__ 160
Raised temperature in 5 minutes to _____° F__ 212
Boiled for 30 minutes at _____° F__ 212

7. The method of inoculating substantially dry starch-bearing grains to render them self-gelatinizing, for brewing fermented beverages which consists in dehydrating the grains and mixing them with heat-stable, high-potency, odorless and soluble enzymes free of malt-derived contaminants in the proportion of substantially 100 lbs. of grains to 10 to 100 grams of said enzymes.

8. The method of inoculating substantially dry starch-bearing grains to render them self-gelatinizing, for brewing fermented beverages which consists in dehydrating the grains and mixing them with heat-stable, high-potency, odorless and soluble enzymes free of malt-derived contaminants in the proportion of substantially 100 lbs. of grains to 10 to 100 grams of said enzymes, and first treating said enzymes with salts of calcium, phosphate and sodium in the proportion of 25 to 100 parts to 1 to 5 parts of said enzymes.

References Cited in the file of this patent

UNITED STATES PATENTS

| | | |
|---|---|---|
| 2,119,981 | Baker | June 7, 1938 |
| 2,153,445 | Willaman et al. | Apr. 4, 1939 |
| 2,223,520 | Ioannu | Dec. 3, 1940 |
| 2,348,451 | Christensen | May 9, 1944 |
| 2,442,806 | Gluek | June 8, 1948 |

OTHER REFERENCES

Text: The Chemistry and Technology of Enzymes, by H. Tauber, pub. 1949 by John Wiley & Sons, Inc., New York, pp. 74, 75, 330–334, 396–400, 405, 406.